United States Patent

Tukala et al.

[11] Patent Number: 5,634,747
[45] Date of Patent: Jun. 3, 1997

[54] SPIRAL DRILL WITH COOLANT CHANNELS AND METHOD TO MANUFACTURE A SPIRAL DRILL

[75] Inventors: Tommy Tukala, Sandviken; Leif Karlsson, Karlholmsbruk; Kent Eriksson, Gimo, all of Sweden

[73] Assignee: Sandvik AB, Sandviken, Sweden

[21] Appl. No.: 436,214

[22] PCT Filed: Dec. 1, 1993

[86] PCT No.: PCT/SE93/01034

§ 371 Date: Jul. 5, 1995

§ 102(e) Date: Jul. 5, 1995

[87] PCT Pub. No.: WO94/13422

PCT Pub. Date: Jun. 23, 1994

[30] Foreign Application Priority Data

Dec. 10, 1992 [SE] Sweden .............................. 9203716-7

[51] Int. Cl.⁶ .............................................. B23B 51/02
[52] U.S. Cl. ................... 408/59; 408/57; 408/224; 76/108.6
[58] Field of Search ....................... 408/59, 57, 224, 408/223; 76/108.6, 108.1, 115

[56] References Cited

U.S. PATENT DOCUMENTS

| 2,148,805 | 2/1939 | Cogsdill ............... 76/108.1 |
|---|---|---|
| 2,541,849 | 2/1951 | Villeneuve . |
| 3,040,605 | 6/1962 | Andreasson . |
| 3,096,668 | 7/1963 | Maynard . |
| 3,117,471 | 1/1964 | O'Connekk et al. ............ 76/108.6 |
| 3,504,575 | 4/1970 | Makino et al. . |
| 3,555,935 | 1/1971 | Dorrenberg . |
| 4,293,251 | 10/1981 | Anderson .................. 408/59 |
| 4,583,888 | 4/1986 | Mori et al. . |
| 4,704,055 | 11/1987 | Gühring . |
| 5,509,761 | 4/1996 | Grossman et al. ............ 408/59 |

FOREIGN PATENT DOCUMENTS 2945635   5/1981   Germany .................. 408/59

*Primary Examiner*—M. Rachuba
*Assistant Examiner*—Henry W. H. Tsai
*Attorney, Agent, or Firm*—Burns, Doane, Swecker & Mathis, L.L.P.

[57] ABSTRACT

A spiral drill and a method to manufacture a spiral drill with two indexable inserts at different distances from the center line and two coolant channels, where the coolant channels (23,24) run parallel to the center line within the shank part, and where the spiral part has been twisted while heated to form spirally curved coolant channels (17,18), and where exit channels at the tip have been drilled after twisting, and where the exit openings (21,2) are located at different distances from the center line.

5 Claims, 1 Drawing Sheet

Fig. 1
Fig. 2
Fig. 3
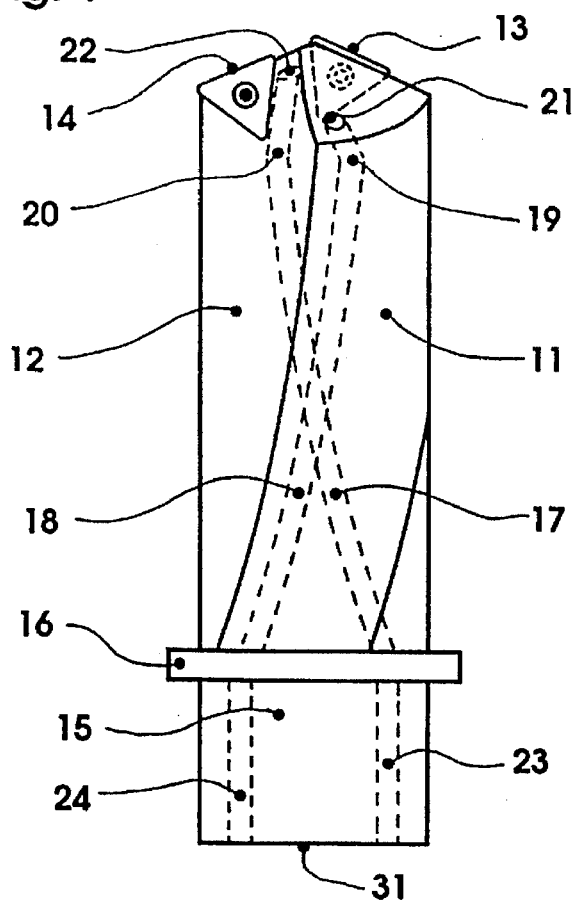
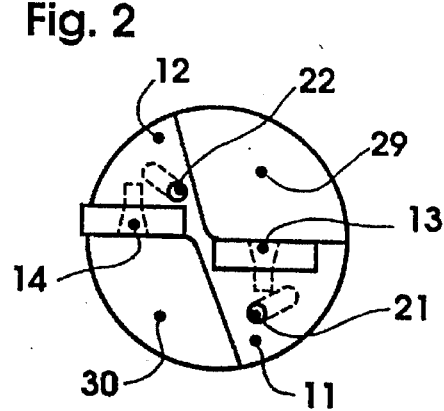
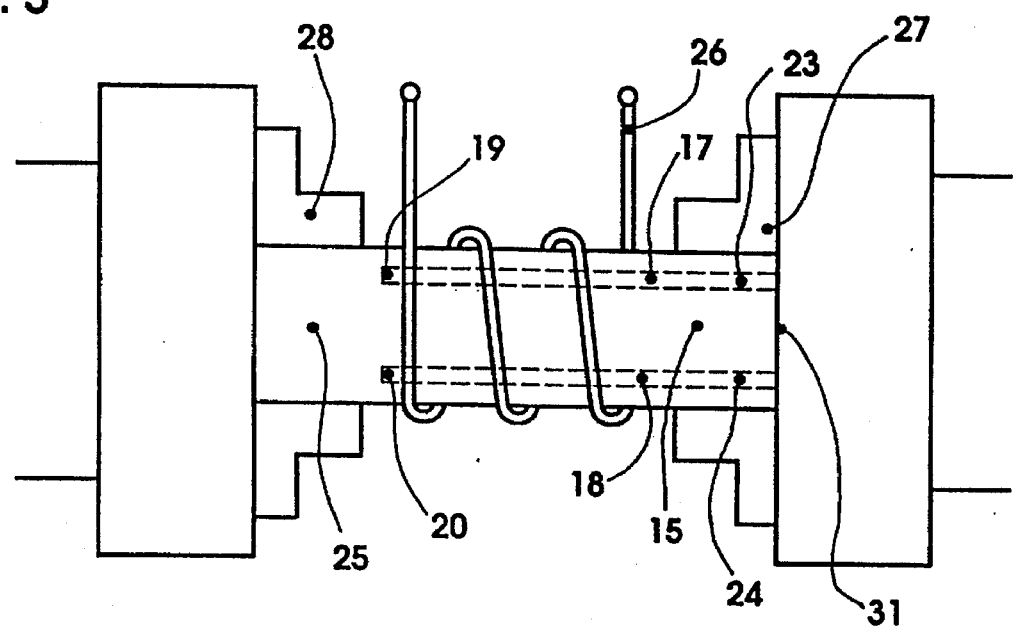

SPIRAL DRILL WITH COOLANT CHANNELS AND METHOD TO MANUFACTURE A SPIRAL DRILL

BACKGROUND OF THE INVENTION

1. Field of the invention

The present invention relates to spiral drills with indexable inserts.

2. Discussion of related art

Spiral drills comprise a spiral part with cutting edges at a tip end, and a shank part which to at least some extent is bounded by cylindrical surfaces. With spiral drills for metal drilling it is of great importance that no chips are packed in the spiral flutes, since even a small counter pressure from adhering chips will seriously disturb the chip formation and lead to greatly increased feed and cutting forces, as well as slower feed rate.

To facilitate the chip flow through the spiral flutes these should be made with a spacious cross section shaped to avoid pressing the chips against the wall of the hole. It is also suitable to supply liquid through coolant channels to openings near the cutting edges, which facilitates chip formation and lowers friction in the flutes. In order not to lower the torsion stiffness or give an undesirable coupling between axial force and torsion angle, the drill can be made with two spiral coolant channels as shown in the patents SE 335 111 and DE 33 04 277, located between the flutes in the ribs where they are least detrimental to the strength and stiffness. Those patents show how a drill can be made from a such a spiral part joined to a separately made shank part with different location of coolant channels.

It is also known through patent SE 194 706 to make drills with indexable carbide inserts in pockets on a steel body, where it has been made possible to utilize a limited number of insert sizes for a large number of drill diameters by using two or more unsymmetrically located inserts, one of which is a center insert close to the center line of the drill and one of which is a peripheral insert close to the periphery of the drill.

SUMMARY AND OBJECTS

The invention concerns a spiral drill with coolant channels which for the larger part of their length are placed where they detract as little as possible from the strength and stiffness of the drill, and to a smaller part near the cutting edges are located in relation to the location of drill inserts to give an optimal cooling and lubricating effect.

Previously known drills with spiral coolant channels have had channels continuing through the whole spiral part with constant position relative to the cross-section, whether they were made by twisting of a milled blank, forging or extrusion. In some cases where the drill blanks were forged, the channels were made before forging, filled with a substance with low melting-point and either not continued through the tip end face, or plugged at the end with a metal with high melting-point.

According to the invention coolant channels may be drilled in a cylindrical drill blank from the shank-part but not through to the tip end. The spiral part of the blank is then locally heated and twisted a predetermined angle. After twisting, the flutes, the insert pockets and other surfaces of the tip are machined using the channels at the shank part as an angle reference, and straight exit channels are drilled from exit openings in the tip face to meet the coolant channels. This makes it possible to locate the exit openings at optimal positions relative to the inserts without regard of the spiral channel location in the cross-section.

The insert pockets are unsymmetrically located, one near the center and one near the periphery. For best lubrication and cooling, the exit openings should be located at the same radius as the midpoint of the following insert, and thus one exit opening should be located closer to the center and one closer to the periphery, which is accomplished by drilling the exit channels after machining of the insert pockets.

BRIEF DESCRIPTION OF THE DRAWINGS

The invention is described in detail with reference to the figures, where FIG. 1 shows a drill according to the invention, FIG. 2 an axial view of the tip end of the drill and FIG. 3 a drill blank prepared for twisting.

DETAILED DESCRIPTION OF THE PREFERRED EMBODIMENTS

A drill according to the invention comprises a shank part (15), a spiral part with two flutes (29,30), two ribs (11,12) and a tip where one center insert (13) and one peripheral insert (14) are fastened with screws to pockets machined at the ends of the ribs (11,12). To give the drill a well defined axial position when mounted in a machine, it can be made with a flange (16) between the shank part and the spiral part.

Within each rib (11,12) there is a coolant channel (17,18) spirally curved with the same curvature as the rib, and continuing in the shank part (15) as a straight channel (23,24) at constant distance from a center line all the way to an end face (31) of the shank part.

The spiral coolant channels (17,18) end at terminal points (19,20) within the ribs (11,12) near the tip. Straight exit channels lead from the terminal points to exit openings (21,22) in the tip end face behind the inserts. The exit openings are not symmetrically located, but the exit opening (21) on the rib (11) carrying the center insert (13) is located radially farther from the center line to cool and lubricate the following peripheral insert (14), and the exit opening (22) on the rib (12) carrying the peripheral insert (14) is located closer to the center line to cool and lubricate the following center insert (13).

A drill according to the invention is manufactured from a cylindrical drill blank with two straight parallel axial channels to be made into coolant channels (23,24) running from the end face (31) to terminal points (19,20) within the blank near the other end (25) which is to become the tip end. The drill blank is mounted in two chucks (27, 28), one of the chucks (27) holding what is to be the shank part (15) and the other chuck (28) holding a part of the blank near the end (25) to become the tip end. The drill blank is heated between the chucks by an induction coil (26) or other suitable means, whereupon the drill blank is twisted a predetermined angle with the chucks. The grip of the chucks must be stable enough to avoid any twisting of those parts of the drill blank held within the chucks. The portions of the channels (17,18) located between the chucks will become spirally curved, and the position of the terminal points (19,20) will be well defined relative to the straight channel parts (23,24).

After twisting the drill blank is reduced to its final diameter, and the flutes (29,30) machined. By using the straight parts of the channels (23,24) as an angle reference, the flutes can be made to follow the coolant channels (17,18) at an appropriate distance. The pockets for the inserts (13,14) are machined and straight exit channels are drilled from the exit openings (21,22) to the terminal points (19,20), with the exit openings located at different radial distances from the center line.

We claim:

1. A spiral drill adapted to support indexable cutting inserts, said drill comprising:

a shank part;

a spiral part projecting forwardly from said shank part and including two spirally curved ribs, pockets formed in forward ends of respective ones of said ribs for receiving respective cutting inserts, a first of said pockets being located farther from a center line of said drill than is a second of said pockets; and coolant channels each extending through both said shank and one of said ribs and forming an exit opening at said forward end of a respective rib, each coolant channel including a spirally curved portion disposed in its respective rib and having the same curvature as the rib, there being no more than two coolant channels in said spiral part, a first of said exit openings being located farther from said center line than is a second of said exit openings.

2. The drill according to claim 1, wherein said first exit opening is disposed in one of said ribs which possesses said second pocket, and said second exit opening is disposed in one of said ribs which possesses said first pocket.

3. The drill according to claim 1, wherein each spirally curved portion extends at a constant distance from said center line, said constant distance being the same for both of said spirally curved portions, each of said spirally curved portions terminating rearwardly of its respective exit opening and being connected thereto by a straight portion of said coolant channel.

4. The drill according to claim 1, wherein a portion of each coolant channel is located in said shank and is straight.

5. A method for the manufacture of spiral drills with coolant channels, comprising the steps of:

A) drilling in a cylindrical bank only two parallel holes spaced by a same distance from a center line of said blank, said holes extending from a first end of said cylindrical blank to terminal points located within said blank near a second end thereof;

B) heating at least a middle portion of said blank;

C) gripping said first and second end portions of said blank with chuck devices;

D) applying torque to said chuck devices to twist said middle portion by a predetermined angle to reform said two parallel holes within said middle part into two spirally curved channels;

E) subsequent to step D, machining in said middle portion:

1) a tip end face having two insert pockets, and 2) spiral flutes forming therebetween a pair of spiral ribs, each rib containing only one of said insert pockets and only one of said spirally curved channels; and F) drilling two straight non-parallel exit channels from said tip end face to respective ones of said terminal points to form exit openings in said tip end face which are spaced at different distances from said center line.

\* \* \* \* \*